(12) United States Patent
White (10) Patent No.: US 9,039,901 B2
(45) Date of Patent: May 26, 2015

(54) MAGNETIC WATER CONDITIONER (75) Inventor: John W. White, Clyde, TX (US)

(73) Assignee: Flo-Rite Fluids, Inc., Abilene, TX (US)

(*) Notice: Subject to any disclaimer, the term of this patent is extended or adjusted under 35 U.S.C. 154(b) by 0 days.

(21) Appl. No.: 12/117,083

(22) Filed: May 8, 2008

(65) Prior Publication Data
US 2008/0277352 A1  Nov. 13, 2008

Related U.S. Application Data (60) Provisional application No. 60/916,743, filed on May 8, 2007.

(51) Int. Cl.
C02F 1/48 (2006.01)

(52) U.S. Cl.
CPC ............ C02F 1/481 (2013.01); *C02F 2201/48* (2013.01)

(58) Field of Classification Search
CPC ...... B03C 1/0332; B03C 1/034; B03C 1/286; B03C 1/288; B03C 1/30; C02F 1/48; C02F 1/481; C02F 2201/48
USPC .......................................... 210/222, 695, 223
See application file for complete search history.

(56) References Cited

U.S. PATENT DOCUMENTS

| | | | |
|---|---|---|---|
| 2,789,655 A * | 4/1957 | Preston et al. ...................... 96/1 |
| 2,792,115 A | 5/1957 | Medearis | |
| 2,825,464 A | 3/1958 | Mack | |
| 3,680,705 A | 8/1972 | Happ et al. | |
| 4,145,208 A * | 3/1979 | Gulko et al. ...................... 71/29 |
| 4,167,480 A | 9/1979 | Mach | |
| 4,216,092 A | 8/1980 | Shalhoob et al. | |
| 4,289,621 A * | 9/1981 | O'Meara, Jr. .................. 210/222 |
| 4,299,700 A | 11/1981 | Sanderson | |
| 4,299,701 A | 11/1981 | Garrett et al. | |
| 4,491,120 A | 1/1985 | Hodgkins | |
| 4,505,815 A * | 3/1985 | Lindler .......................... 210/223 |
| 4,532,040 A | 7/1985 | Meeks et al. | |
| 4,539,102 A | 9/1985 | Boston et al. | |
| 4,711,271 A | 12/1987 | Weisenbarger et al. | |
| 4,769,130 A | 9/1988 | Christensen | |

(Continued)

FOREIGN PATENT DOCUMENTS

| | | |
|---|---|---|
| GB | 2132997 A | 7/1984 |
| SU | 649-441 | 2/1979 |

(Continued)

OTHER PUBLICATIONS

Non-Final Office Action in U.S. Appl. No. 12/033,681, mailed Jun. 24, 2008 (9 pages).

(Continued)

*Primary Examiner* — David C Mellon
(74) *Attorney, Agent, or Firm* — Gardere Wynne Sewell LLP (57) ABSTRACT

A magnetic water conditioner treats water with a magnetic field. The magnetic water conditioner includes a tank having an inlet operable to receive water from a pump and an outlet operable to discharge the water. The magnetic water conditioner is installed in close proximity to the pump. A plurality of permanent magnet members are aligned and spaced apart in the interior of the tank with north and south poles disposed at opposite sides of the permanent magnet members. The water flows through the gaps between the permanent magnet members, thus being subjected to magnetic fields created by the permanent magnet members.

33 Claims, 7 Drawing Sheets

(56) References Cited

U.S. PATENT DOCUMENTS

| | | |
|---|---|---|
| 4,935,133 A | 6/1990 | Hirama |
| 4,938,875 A | 7/1990 | Niessen |
| 4,995,425 A | 2/1991 | Weisenbarger et al. |
| 4,999,106 A * | 3/1991 | Schindler .................. 210/222 |
| 5,009,791 A | 4/1991 | Lin et al. |
| 5,024,271 A | 6/1991 | Meihua |
| 5,037,546 A | 8/1991 | Janczak et al. |
| 5,043,063 A * | 8/1991 | Latimer .................... 210/222 |
| 5,052,491 A | 10/1991 | Harms et al. |
| 5,055,190 A * | 10/1991 | Hayes et al. ............... 210/222 |
| 5,118,416 A | 6/1992 | Janczak et al. |
| 5,122,277 A | 6/1992 | Jones |
| 5,178,757 A | 1/1993 | Corney |
| 5,269,915 A | 12/1993 | Clair |
| 5,366,623 A | 11/1994 | Clair |
| 5,453,188 A | 9/1995 | Florescu et al. |
| 5,454,943 A | 10/1995 | Ashton et al. |
| 5,520,158 A | 5/1996 | Williamson |
| 5,660,723 A | 8/1997 | Sanderson |
| 5,700,376 A | 12/1997 | Carpenter |
| 5,755,970 A | 5/1998 | Fourqurean et al. |
| 5,871,642 A | 2/1999 | Meeks |
| 5,944,195 A | 8/1999 | Huang et al. |
| 6,056,872 A | 5/2000 | Glass |
| 6,077,333 A * | 6/2000 | Wolfs ....................... 96/1 |
| 6,171,504 B1 | 1/2001 | Patterson |
| 6,216,527 B1 | 4/2001 | Beecham et al. |
| 6,491,825 B2 | 12/2002 | Kamibayashi et al. |
| 6,602,411 B1 | 8/2003 | Aida et al. |
| 7,350,409 B2 | 4/2008 | Klatt |
| 7,357,862 B2 | 4/2008 | White |
| 7,572,371 B2 | 8/2009 | White |
| 7,591,175 B2 | 9/2009 | Klatt |
| 7,665,546 B2 | 2/2010 | Ruttley |
| 8,298,428 B2 | 10/2012 | Hagen |
| 2002/0084224 A1 * | 7/2002 | Tovar De Pablos et al. .. 210/695 |
| 2005/0056579 A1 | 3/2005 | Hodgson |
| 2006/0006106 A1 * | 1/2006 | White ....................... 210/175 |
| 2006/0131223 A1 | 6/2006 | Hou et al. |
| 2007/0108116 A1 * | 5/2007 | Meeks ...................... 210/222 |
| 2007/0205158 A1 * | 9/2007 | Shanahan et al. ........... 210/695 |
| 2010/0270216 A1 | 10/2010 | Burnett et al. |
| 2011/0139722 A1 | 6/2011 | Simonson |

FOREIGN PATENT DOCUMENTS

| | | |
|---|---|---|
| WO | WO-2006/010124 A2 | 1/2006 |
| WO | WO-2007001729 A2 | 1/2007 |

OTHER PUBLICATIONS

Final Office Action in U.S. Appl. No. 12/033,681, mailed Dec. 15, 2008 (9 pages).
Flo-Rite Fluids, Inc.—advertisement brochure (undated), 5 pages.
Flo-Rite Fluids, Inc.—Magnetic Fluid Conditioners, brochure (undated), 14 pages.

* cited by examiner

FIG. 9

US 9,039,901 B2

MAGNETIC WATER CONDITIONER

CROSS-REFERENCE TO RELATED APPLICATIONS

This application is a United States Non-Provisional patent application which claims the benefit of priority from U.S. Provisional Patent Application No. 60/916,743, filed May 8, 2007.

FIELD OF THE INVENTION

The present invention relates generally to the field of water treatment, and more particularly to magnetic water conditioning.

BACKGROUND

Water extracted from underground formations often includes suspended substances such as calcium carbonate and other minerals. Some of the suspended minerals are undesirable, as over a period of time they form scale in the internal wall of pipes and other vessels used to transport the water. Often, a build-up of scale can clog pipes and irrigation devices such as drip irrigation devices, thereby degrading their effectiveness.

Magnetic water conditioners have been used to treat water with a magnetic field to reduce scale build-up in pipes and vessels. Existing magnetic water conditioners generally comprise a plurality of multi-pole magnets, which are positioned concentrically encircling a water tank. The magnets generate a magnetic field inside the water tank through which the water flows. The magnetic field deforms the molecules of the suspended minerals, thus reducing scale build-up.

Existing magnetic water conditioners are typically difficult to implement. The magnets must be shaped and sized to concentrically encircle a water tank. Also, the magnets must generate adequate magnetic flux inside the tank to effectively treat the water. Also, the tank must be made of a material that minimally affects the magnetic field created by the magnets.

Accordingly, a need exists for an improved magnetic water conditioner that provides a solution to the foregoing disadvantages.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE DRAWINGS

Figure 1:
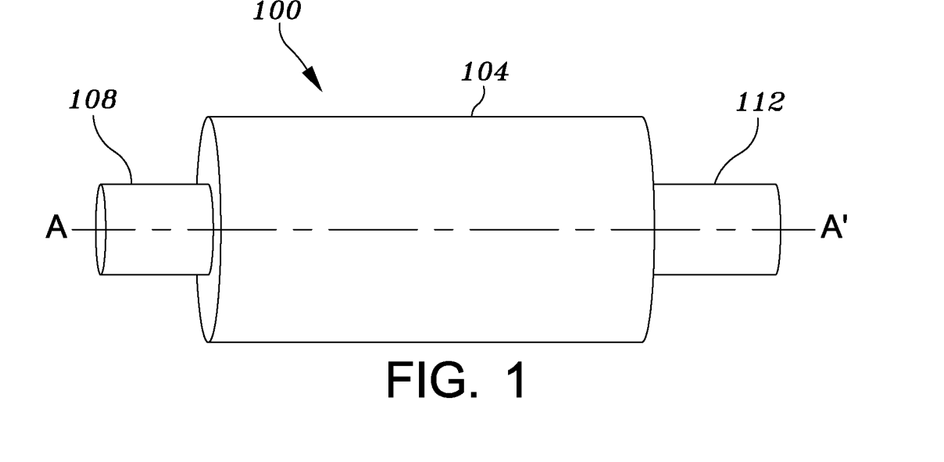
FIG. 1 is a perspective view of a magnetic water conditioner.

FIG. 1 is a perspective view of a magnetic water conditioner 100. The magnetic water conditioner 100 is suitable for treating water with a magnetic field, e.g., for conditioning water in order to make the water more suitable for irrigation equipment or the like. References to water herein are intended to include water of varying degrees of purity, including saltwater, effluent water, and aquifer water. The magnetic water conditioner 100 includes a tank 104 having an inlet 108 for receiving water, directly or indirectly, from a water source. The inlet 108 may be coupled, via a pipe, to a pump (not shown in FIG. 1) that supplies the water to the magnetic water conditioner 100. The magnetic water conditioner 100 includes an outlet 112 for discharging the magnetically treated water. A pipe, for example, can be coupled to the outlet 112 to transport the magnetically treated water from the magnetic water conditioner 100.

In one embodiment, a thread collar can be provided to the inlet 108 and a thread collar can be provided to the outlet 112. The threading allows the inlet 108 to be attached to an inlet pipe to receive water from a pump and allows the outlet 112 to be attached to an outlet pipe to supply water to an agricultural site.

The tank 104 can be cylindrical, having a longitudinal axis indicated by the lines A-A' and a circumference. The cylindrical shape of the tank 104 defines a channel along the longitudinal axis A-A', which is the flow region of the water. Accordingly, water can enter the tank through the inlet 108, flow through the channel, and exit through the outlet 112. It will be recognized that the size and configuration of the tank 104, including the cross sectional area of the channel, can vary depending on the particular application in which the magnetic water conditioner 100 will be utilized. As described in greater detail below, structures inside the tank 104 partially impede the flow of water between the inlet 108 and the outlet 112. It is therefore preferable for the diameter of the tank 104 to be larger than the diameter of the inlet 108 and other upstream conduit in order to avoid undesired backpressure upstream from the magnetic water conditioner 100. The tank 104 can be made from stainless steel or other suitable material.

Figure 2:
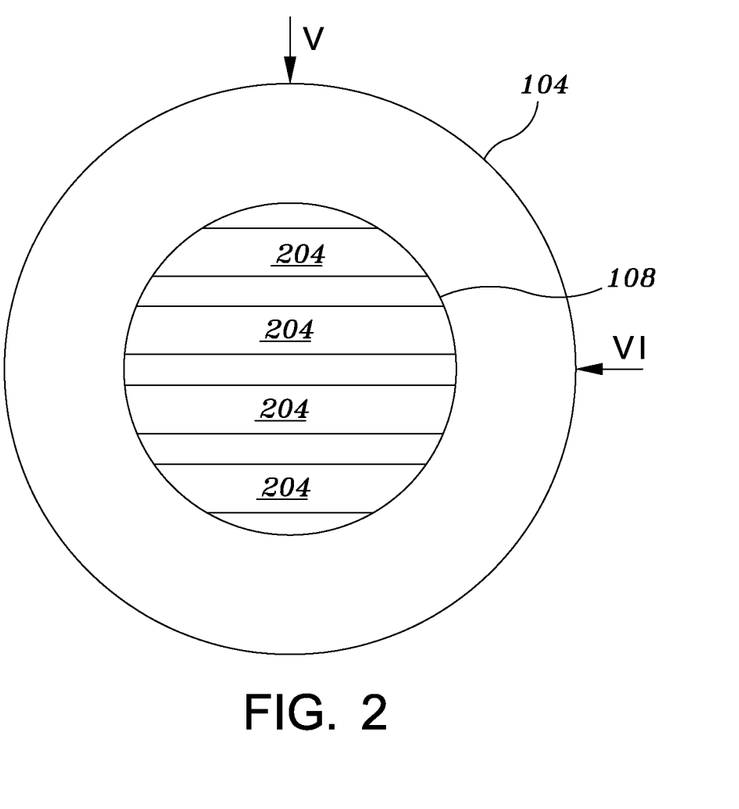
FIG. 2 is an end-view of the magnetic water conditioner shown in FIG. 1.
Figure 9:
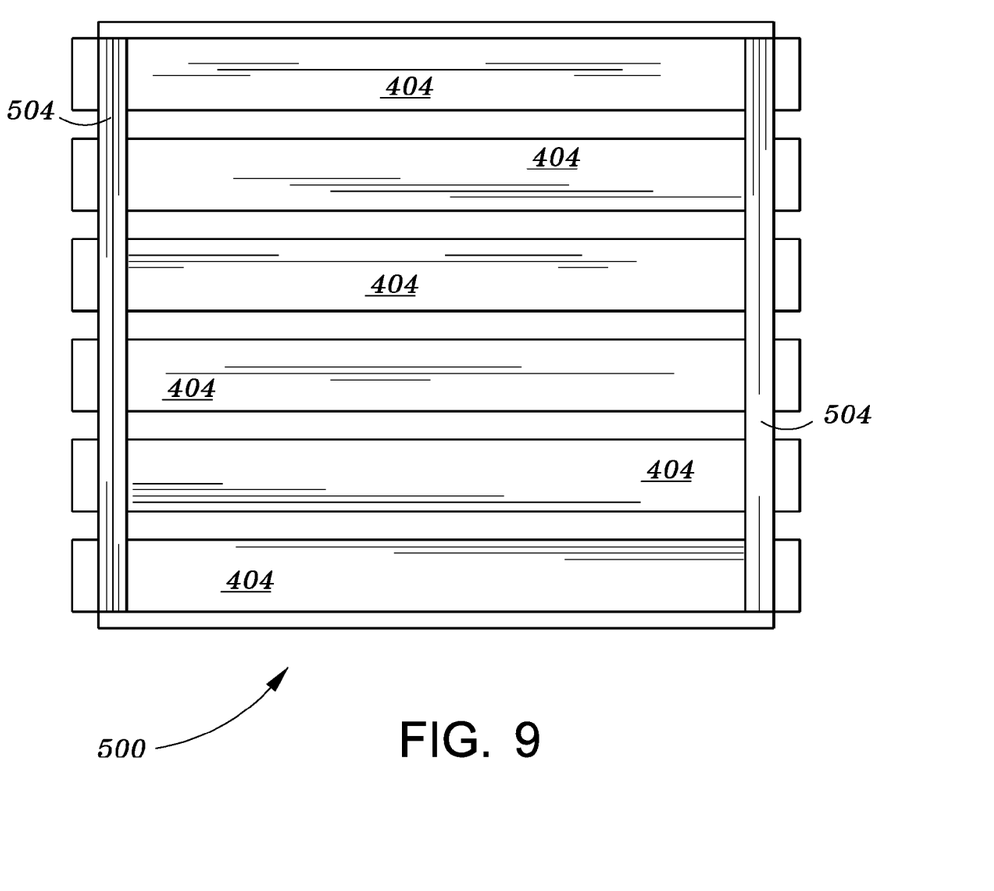
FIG. 9 shows an end view of the internal water conditioner assembly shown in FIG. 8.

FIG. 2 is an end-view of the magnetic water conditioner 100 as it appears looking into the inlet 108 and the outlet 112. FIG. 9 also shows a perspective end-view of the magnetic water conditioner 100. A plurality of permanent magnet members 204 are mounted inside the tank 104 so as to be rigidly fixed in place. In one embodiment, the permanent magnet members 204 are mounted spaced apart and are perpendicular to the flow path of the water. As the water flows through the channel, the water passes through the gaps between the permanent magnet members 204.

Figure 3A:
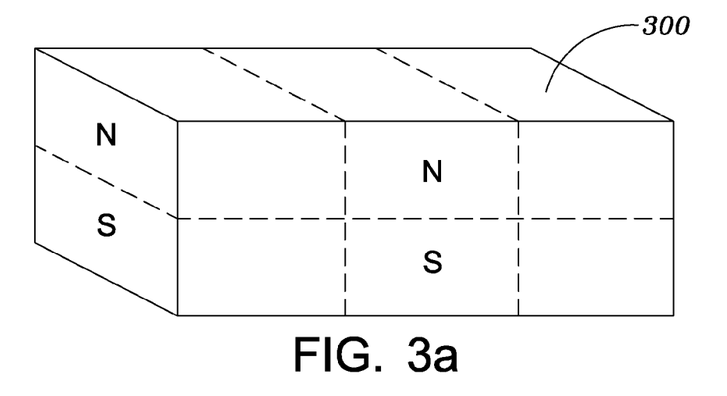
FIG. 3a illustrates in perspective view a magnet orientation used in the implementation of a permanent magnet member.
Figure 3B:
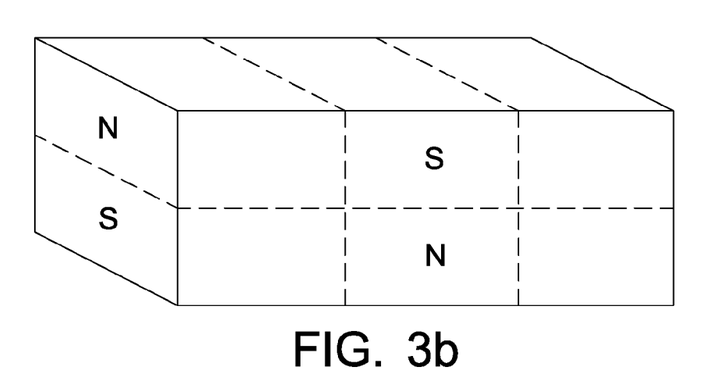
FIG. 3b illustrates in perspective view a different magnet orientation used in the implementation of a permanent magnet member.

FIG. 3 illustrates the permanent magnet 300 used in the permanent magnet member 204 in accordance with one embodiment of the invention. The permanent magnet 300 may be a rectangular shaped magnet having a desired length, width and height, with north and south poles at opposite sides of the magnet 300. For example, commercially-available magnets can be used that have a 1 inch square face and are 4 inches long. As will be recognized by those skilled in the art, the magnet 300 may be constructed from a single magnet or from a plurality of smaller rectangular shaped magnets as indicated by the phantom (broken) lines. The smaller, rectangular shaped magnets are aligned so that the north and south poles are at opposite sides. Also, it will be recognized by those skilled in the art that multiple magnets may be used to construct the permanent magnet member 204.

Figure 4:
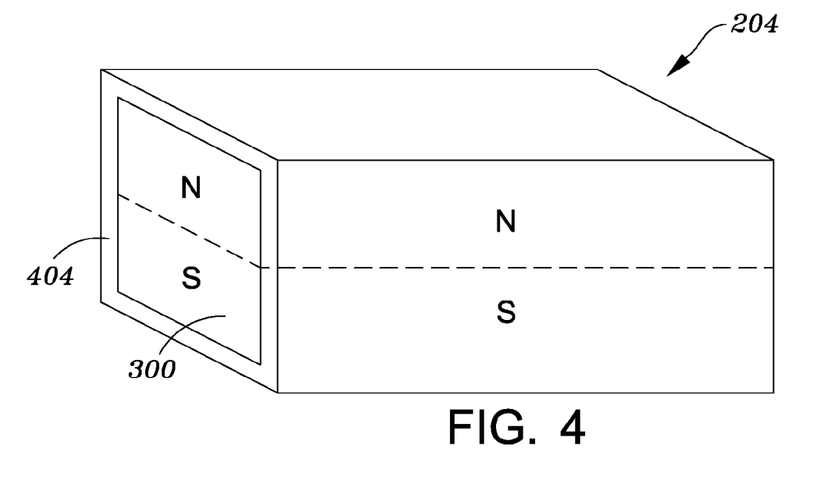
FIG. 4 in perspective view shows a permanent magnet fitted inside a rectangular tube.

In one embodiment, the permanent magnet 300 is fitted inside a rectangular tube 404 shown in FIG. 4 sized to form the permanent magnet member 204. Preferably, the rectangular tube 404 is made of an alloy that will minimally interfere with the magnetic field generated by the magnet inside the tube 404. In one embodiment, after the rectangular tube 404 is fitted with the magnet, epoxy or like substance is poured inside the tube 404 to protect the magnet 300 from the effects of moisture. For example, commercially-available magnets that have a 1 inch square face can be placed in a 1¼ inch square metal tube, then the remaining space inside the tube is filled with an epoxy resin or the like.

Figure 5:
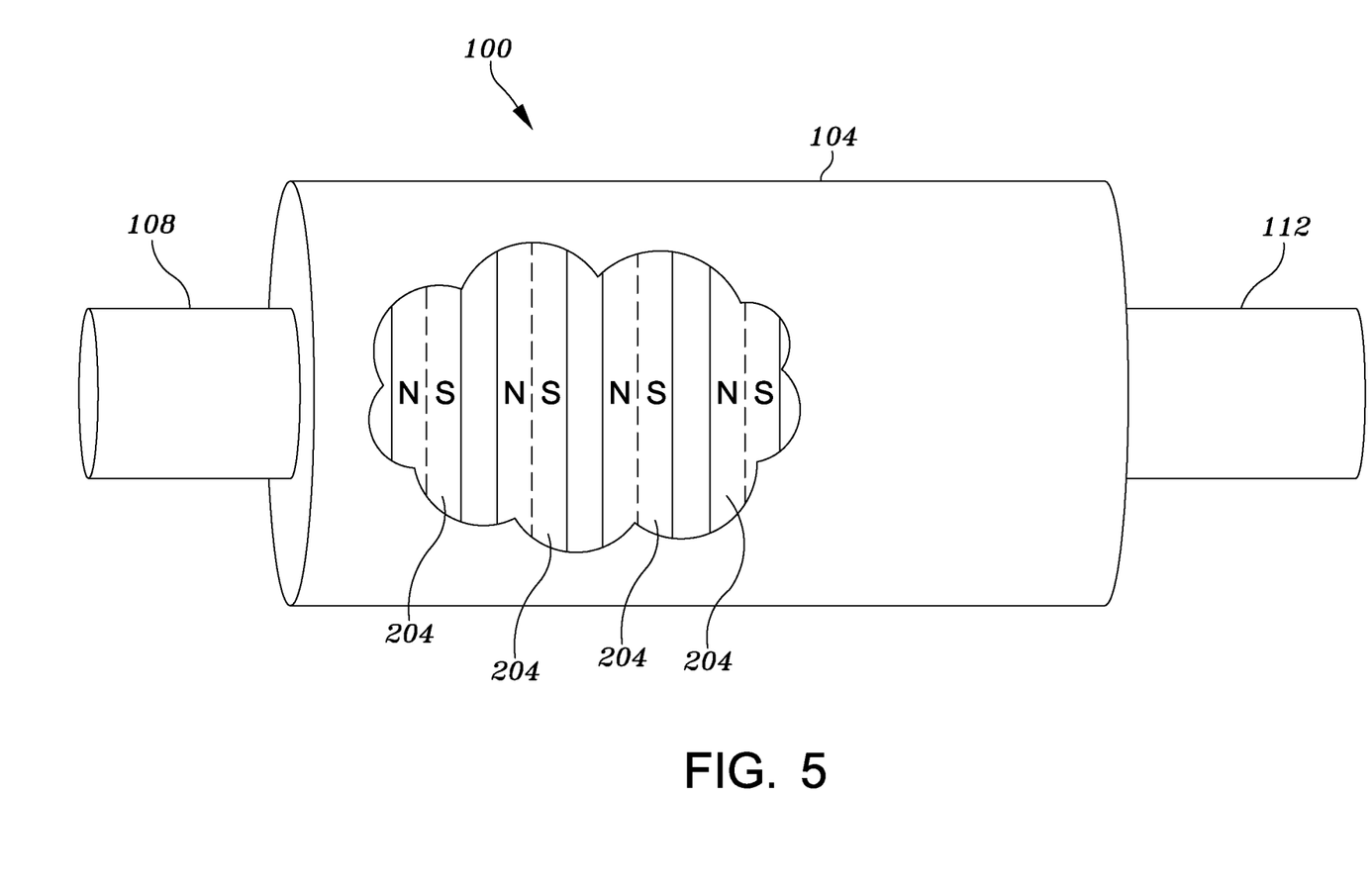
FIG. 5 shows a partially broken away perspective view of the magnetic water conditioner as viewed in direction V as indicated in FIG. 2.
Figure 8:
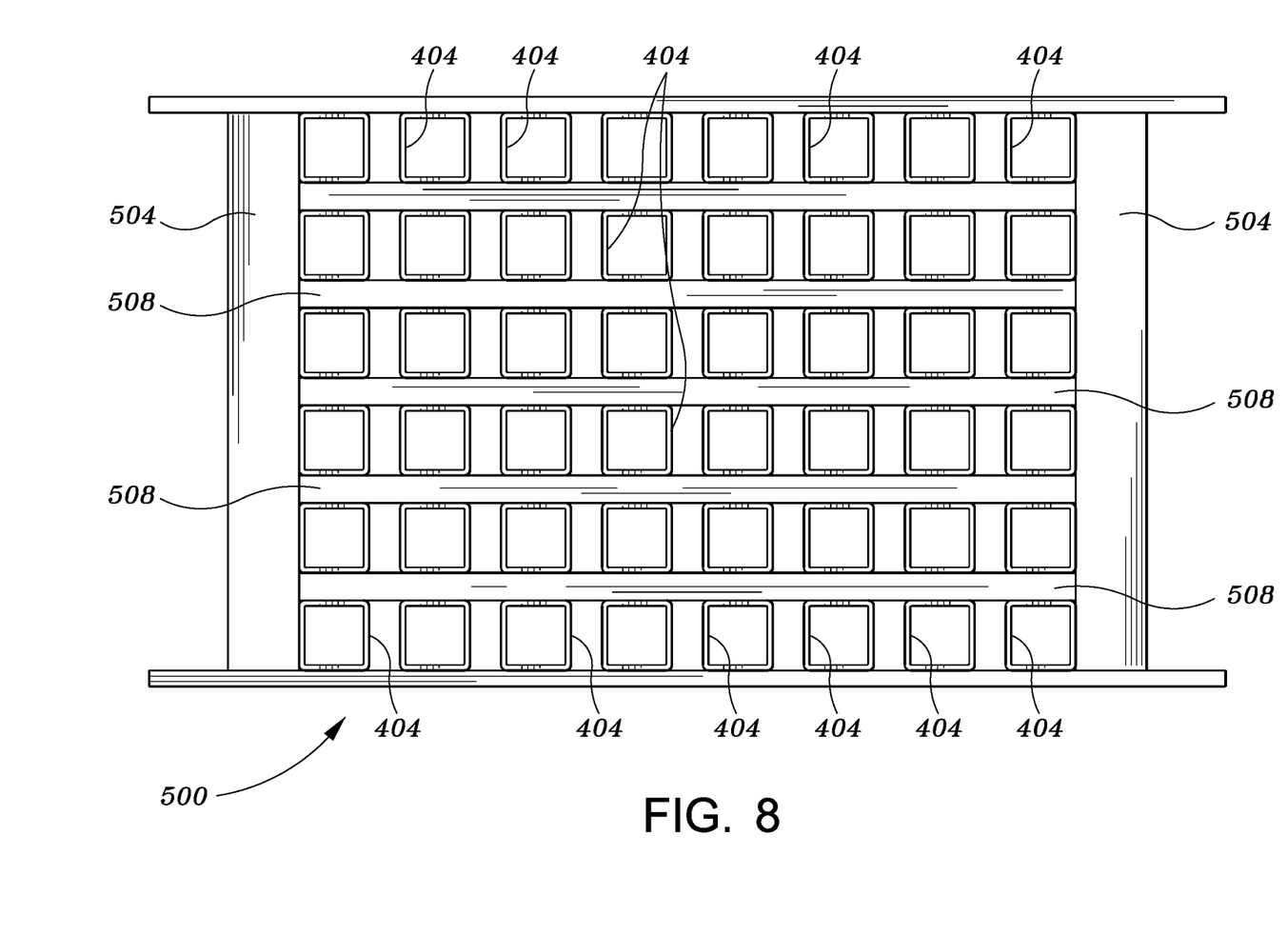
FIG. 8 shows a side view of an internal water conditioner assembly.

FIG. 5 shows a partially broken-away perspective view of the magnetic water conditioner 100 shown in FIGS. 1 and 2 from the direction V as indicated in FIG. 2. The partially broken away view in FIG. 5 allows for a partial view of the top of the internal magnet assembly 500. Note that in FIG. 5 the support and frame members of the internal magnet assembly are not shown in order to allow for a more clear view of the arrangement of the permanent magnet members 204. Additional views of the internal magnet assembly 500 are also shown in FIGS. 8 and 9 removed from the tank 104. The magnet assembly 500 includes a plurality of the permanent magnet members 204. The permanent magnet members 204 can be secured by frames 504 and 508, shown in FIG. 8, forming a generally rectangularly-shaped structure. The permanent magnet members 204 are spaced apart and are substantially parallel to one another. The permanent magnet members 204 are aligned so that the north poles N and south poles S are disposed at opposite sides of the permanent magnet members 204, and furthermore the two sides of adjacent members 204 facing one another have opposite polarities. The opposite poles generate magnetic field in the gaps between the members 204.

In one embodiment, a plurality of magnet assemblies 500 are installed in the flow region of the tank 104. Preferably, the magnet assemblies 500 are installed in parallel and are spaced apart. As the water flows through the tank 104, the water passes through an array of magnet assemblies 500 and consequently the water is subjected to the magnetic fields.

Figure 6:
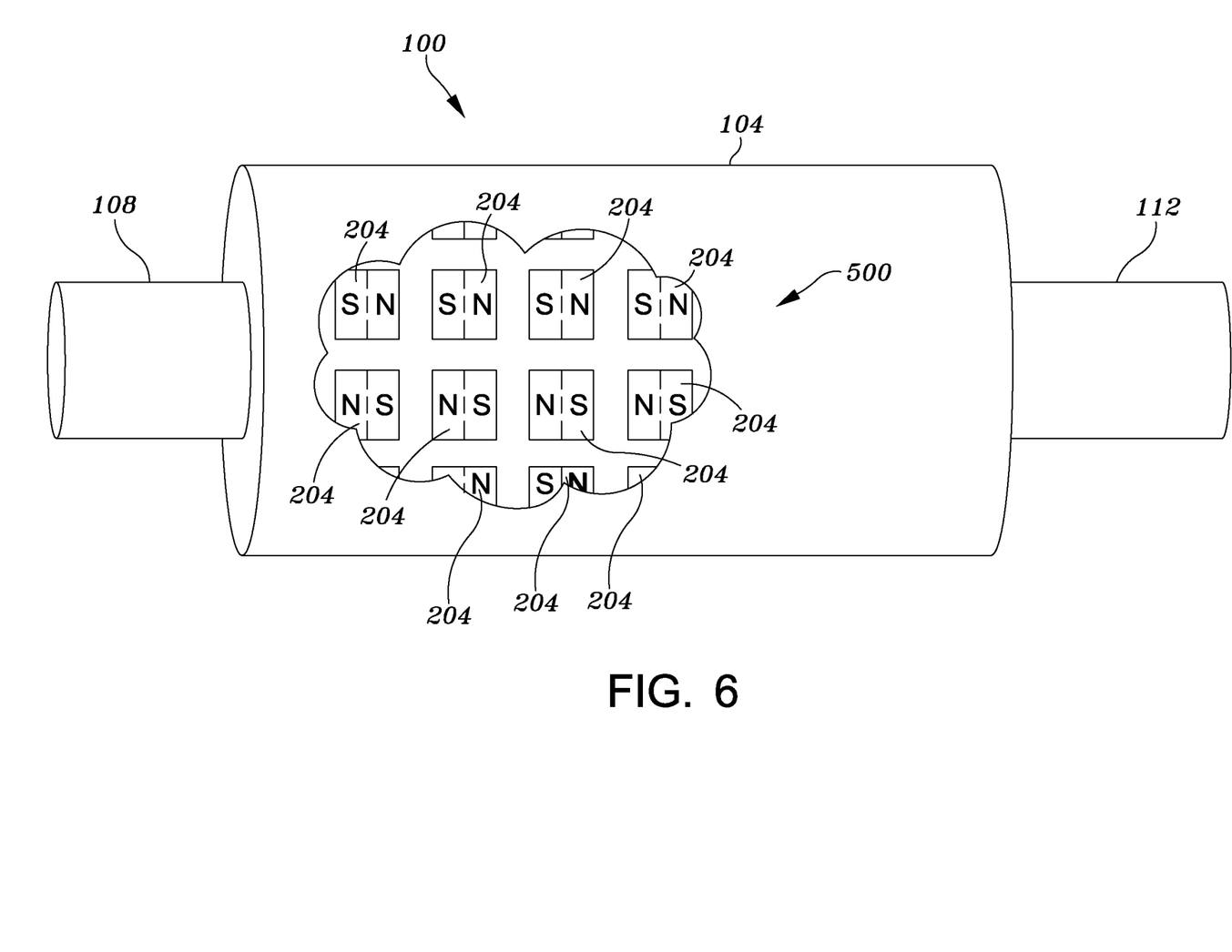
FIG. 6 shows a partially broken away perspective view of the magnetic water conditioner as viewed in direction VI as indicated in FIG. 2.

FIG. 6 shows another partially broken-away perspective view of the magnetic water conditioner 100 shown in FIGS. 1 and 2 from the direction VI as indicated in FIG. 2. The partially broken away view in FIG. 6 allows for a partial view of the side of the internal magnet assembly 500. Note that in FIG. 6 the support and frame members of the internal magnet assembly are not shown in order to allow for a more clear view of the arrangement of the permanent magnet members 204. The water flow path is indicated by a series of arrows inside the tank 104. As shown in FIG. 6, the permanent magnet members 204 are arranged in a grid-like pattern and are spaced apart in order to allow for water to flow between them. As the water flows between the permanent magnet members 204, the water is exposed to magnetic fields that are generated by the permanent magnet members 204.

In one embodiment, the permanent magnet members 204 and the magnet assembly 500 are implemented to generate numerous magnetic field transitions within a short distance. In one embodiment, the permanent magnet members 204 and the magnet assemblies 500 are implemented to provide at least 3 magnetic field transitions per foot. In a preferred embodiment the magnet field within the tank ranges from 7000 gauss near the center of the tank 104 to 3500 gauss near the edges of the tank 104.

The magnets 300 can be implemented using rare earths, with adequate magnetic flux density in the water flow path. In one embodiment, neodymium iron boron is used to implement the magnets 300.

Figure 7:
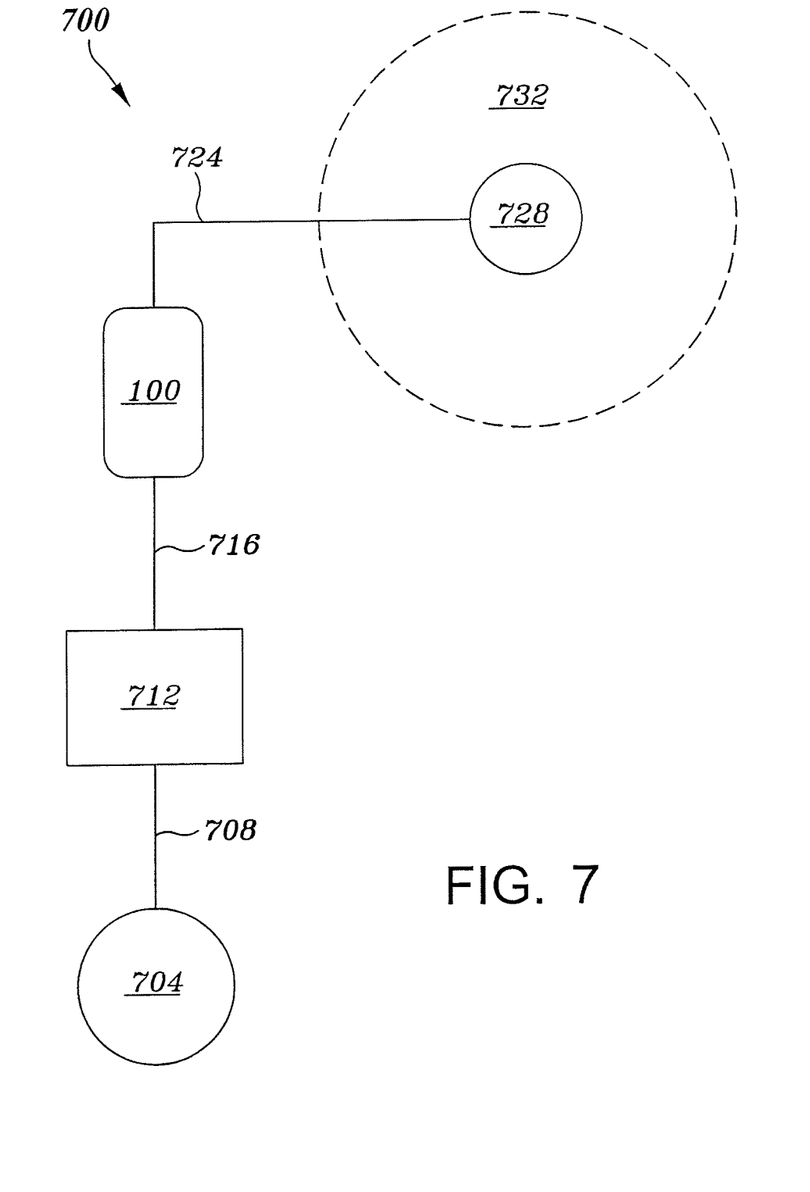
FIG. 7 shows an exemplary irrigation system utilizing the magnetic water conditioner for irrigation purposes.

FIG. 7 shows an exemplary irrigation system 700, which utilizes a magnetic water conditioner 100 for irrigation purposes. Water is sourced from a water well head 704 and transported, via a pipe 708, to a pump 712. The pump 712 supplies the water, via a pipe 716, to a magnetic water conditioner 100. The water is magnetically treated by the magnetic water conditioner 100, and the treated water is supplied to an irrigation discharge device 728 via a pipe 724. The irrigation discharge device 728 can be a drip irrigation system, a sprinkler system, a ribbon irrigation system, a spray nozzle, or any other such device. The irrigation discharge device 728 irrigates the crop 732. Where it is desirable to add fertilizer to the water for treating the crops 732, the fertilizer should preferably be added to the water after the water has passed through the magnetic water conditioner 100 (e.g., at some point along the pipe 724) for improved crop yields compared to when the fertilizer is added before the water passes through the magnetic water conditioner 100.

The magnetic water conditioner 100 improves the quality of the irrigation water by reducing scale build-up in the pipes and vessels through which the water flows. The magnetic water conditioner 100 also reduces scale build-up in irrigation devices such as a drip irrigation devices. Experiments have shown that water treated with the magnetic water conditioner increases crop output and requires less fertilizer, and without wishing to be bound by theory, it is believed that reduced mineral scale present in treated allows plants greater exposure to light necessary for photosynthesis and growth.

While the structures, apparatus and methods have been described in terms of preferred embodiments, it will be apparent to those of skill in the art that variations may be applied to the structures, apparatus and/or methods and in the steps or in the sequence of steps of the method described herein without departing from the concept, spirit and scope of the invention. All such substitutes and modifications apparent to those skilled in the art are deemed to be within the spirit, scope and concept of the invention as defined by the appended aspects.

What is claimed is:

1. A magnetic fluid conditioner for treating fluid with a magnetic field, the magnetic fluid conditioner comprising:
   a tank having a longitudinal axis and having an inlet disposed at a first end of the tank, the inlet operable to receive fluid, and an outlet disposed at a second end of the tank opposite the first end, the outlet operable to discharge the fluid; and
   a plurality of permanent magnet members arranged in the tank in a matrix formation to define three or more flow paths parallel to the longitudinal axis, wherein the three or more flow paths are in fluid communication with each other,
   wherein each of the permanent magnet members comprises a rectangular tube retaining a plurality of permanent magnets aligned such that each end of each permanent magnet member includes a north pole of one of said plurality of permanent magnets and a south pole of one of said plurality of permanent magnets;
   wherein one or more of the plurality of permanent magnet members includes a height extending along a first axis and a length extending along a second axis, wherein the length is greater than the height, wherein the one or more of the plurality of permanent magnet members are aligned in the matrix formation such that the lengths of said one or more permanent magnet members are not parallel to the tank longitudinal axis and the flow of fluid between said inlet and outlet, wherein the plurality of permanent magnets comprising one or more of the permanent magnet members are aligned such that at least one side of the one or more permanent magnet members has alternating polarities of the permanent magnets along its respective length of the permanent magnet member, wherein adjacent permanent magnet members in the matrix formation have opposite, alternating polarities of the permanent magnets along lengths of adjacent sides of the adjacent permanent magnet members, wherein a first plurality of the permanent magnet members are aligned and spaced apart one another in a singularly alternating magnetic attraction orientation in the interior of the tank to form a first row in the matrix of permanent magnet members, the first row having a spacing between each of the permanent magnet members forming the first row in the matrix, wherein a magnetic attraction is established in the spacing between each of the permanent magnet members forming the first row in the matrix, and wherein both north poles and south poles are disposed at opposite sides of each of the spaced apart permanent magnet members comprising the first row of permanent magnet members in the matrix formation, wherein a second plurality of the permanent magnet members are aligned and spaced apart one another in a singularly alternating magnetic attraction orientation in the interior of the tank to form a second row in the matrix of permanent magnet members, the second row having a spacing between each of the permanent magnet members forming the second row in the matrix, wherein a magnetic attraction is established in the spacing between each of the permanent magnet members forming the second row in the matrix, and wherein both north poles and south poles are disposed at opposite sides of each of the spaced apart permanent magnet members comprising the second row of permanent magnet members in the matrix formation, wherein a third plurality of the permanent magnet members are aligned and spaced apart one another in a singularly alternating magnetic attraction orientation in the interior of the tank to form a third row in the matrix of permanent magnet members, the third row having a spacing between each of the permanent magnet members forming the third row in the matrix, wherein a magnetic attraction is established in the spacing between each of the permanent magnet members forming the third row in the matrix, and wherein both north poles and south poles are disposed at opposite sides of the spaced apart permanent magnet members comprising the third row of permanent magnet members in the matrix formation, wherein a fourth plurality of the permanent magnet members are aligned and spaced apart one another in a singularly alternating magnetic attraction orientation in the interior of the tank to form a fourth row in the matrix of permanent magnet members, the fourth row having a spacing between each of the permanent magnet members forming the fourth row in the matrix, wherein a magnetic attraction is established in the spacing between each of the permanent magnet members forming the fourth row in the matrix, and wherein both north poles and south poles are disposed at opposite sides of each of the spaced apart permanent magnet members comprising the fourth row of permanent magnet members in the matrix formation, wherein the first row in the matrix of permanent magnet members and the second row in the matrix of permanent magnet members are spaced apart from each other to form a first flow path parallel to the longitudinal axis, wherein the second row in the matrix of permanent magnet members and the third row in the matrix of permanent magnet members are spaced apart from each other to form a second flow path parallel to the longitudinal axis, wherein the third row in the matrix of permanent magnet members and the fourth row in the matrix of permanent magnet members are spaced apart from each other to form a third flow path parallel to the longitudinal axis, wherein the permanent magnet members comprising the first and second rows in the matrix formation are positioned spaced apart and opposite each other in an opposite, singularly alternating magnetic relation such that a magnetic attraction is established along the first flow path between the first row of permanent magnet members and the second row of permanent magnet members in the matrix formation, wherein the permanent magnet members comprising the second and third rows in the matrix formation are positioned spaced apart and opposite each other in an opposite, singularly alternating magnetic relation such that a magnetic attraction is established along the second flow path between the second row of permanent magnet members and the third row of permanent magnet members in the matrix formation, wherein the permanent magnet members comprising the third and fourth rows in the matrix formation are positioned spaced apart and opposite each other in an opposite, singularly alternating magnetic relation such that a magnetic attraction is established along the third flow path between the third row of permanent magnet members and the fourth row of permanent magnet members in the matrix formation, wherein the spacing between the permanent magnet members forming the first row, the spacing between the permanent magnet members forming the second row, the spacing between the permanent magnet members forming the third row, and the spacing between the permanent magnet members forming the fourth row each serve as a flow path not parallel to the longitudinal axis to provide fluid communication between the first, second, and third flow paths parallel to the longitudinal axis, and wherein the matrix formation of the plurality of permanent magnet members allows for the fluid to flow from the inlet to the outlet of the tank such that the fluid is subjected to magnetic fields created by the permanent magnet members.

2. The magnetic fluid conditioner of claim 1, wherein the fluid is subjected to the magnetic fields such that the fluid experiences at least three magnetic field transitions per foot as it flows from the inlet to the outlet of the tank.

3. The magnetic fluid conditioner of claim 1, further comprising an assembly for retaining the plurality of permanent magnet members in the matrix formation within said tank.

4. The magnetic fluid conditioner of claim 1, wherein the tank is cylindrical having a circumference.

5. The magnetic fluid conditioner of claim 1, wherein the rectangular tubes are filled with epoxy to protect the permanent magnets from moisture.

6. The magnetic fluid conditioner of claim 1, wherein the magnetic field has an intensity between 3500 and 7000 gauss.

7. The magnetic fluid conditioner of claim 1, wherein the magnetic fluid conditioner is placed downstream to a pump.

8. The magnetic fluid conditioner of claim 1 further comprising an outlet pipe coupled to the outlet to transport the fluid from the magnetic fluid conditioner.

9. The magnetic fluid conditioner of claim 1, wherein the rectangular tubes are made from metal.

10. The magnetic fluid conditioner of claim 1, wherein the lengths of one or more of said plurality of permanent magnet members are aligned perpendicular to the tank longitudinal axis.

11. A magnetic water conditioner for treating water with a magnetic field, the water conditioner being in fluid communication with a water source, the magnetic water conditioner comprising:
   a tank having a longitudinal axis and having an inlet operable to receive water from the water source and an outlet operable to discharge the water, wherein the inlet is disposed at a first end of the tank, and the outlet is disposed at a second end of the tank opposite the first end; and
   a plurality of permanent magnet members arranged in the tank in a matrix formation to define three or more flow paths parallel to the longitudinal axis, wherein the three or more flow paths are in fluid communication with each other,
   wherein each of the permanent magnet members comprises a rectangular tube retaining one or more permanent magnets aligned such that each end of each permanent magnet member includes a north pole of one of said one or more permanent magnets and a south pole of one of said one or more permanent magnets; and
   wherein one or more of the plurality of permanent magnet members includes a height extending along a first axis and a length extending along a second axis, wherein the length is greater than the height,
   wherein the plurality of permanent magnet members are aligned in the matrix formation such that the lengths of said plurality of permanent magnet members are not parallel to the tank longitudinal axis and the flow of water between said inlet and outlet,
   wherein the one or more permanent magnets comprising one or more of the permanent magnet members are aligned such that at least two sides of the one or more permanent magnet members have both a north pole and a south pole along the length of the permanent magnet member,
   wherein a first plurality of the permanent magnet members are aligned and spaced apart one another in the interior of the tank to form a first row in the matrix of permanent magnet members, the first row having a spacing between each of the permanent magnet members forming the first row in the matrix, wherein opposing sides of adjacent permanent magnet members forming the first row in the matrix are arranged in a singularly alternating magnetic attraction orientation such that a magnetic attraction is established in the spacing between each of the permanent magnet members forming the first row in the matrix formation,
   wherein a second plurality of the permanent magnet members are aligned and spaced apart one another in the interior of the tank to form a second row in the matrix of permanent magnet members, the second row having a spacing between each of the permanent magnet members forming the second row in the matrix, wherein opposing sides of adjacent permanent magnet members forming the second row in the matrix are arranged in a singularly alternating magnetic attraction orientation such that a magnetic attraction is established in the spacing between each of the permanent magnet members forming the second row in the matrix formation,
   wherein a third plurality of the permanent magnet members are aligned and spaced apart one another in the interior of the tank to form a third row in the matrix of permanent magnet members, the third row having a spacing between each of the permanent magnet members forming the third row in the matrix, wherein opposing sides of adjacent permanent magnet members forming the third row in the matrix are arranged in a singularly alternating magnetic attraction orientation such that a magnetic attraction is established in the spacing between each of the permanent magnet members forming the third row in the matrix formation,
   wherein a fourth plurality of the permanent magnet members are aligned and spaced apart one another in the interior of the tank to form a fourth row in the matrix of permanent magnet members, the fourth row having a spacing between each of the permanent magnet members forming the fourth row in the matrix, wherein opposing sides of adjacent permanent magnet members forming the fourth row in the matrix are arranged in a singularly alternating magnetic attraction orientation such that a magnetic attraction is established in the spacing between each of the permanent magnet members forming the fourth row in the matrix formation,
   wherein the first row in the matrix of permanent magnet members and the second row in the matrix of permanent magnet members are spaced apart from each other to form a first flow path parallel to the longitudinal axis,
   wherein the second row in the matrix of permanent magnet members and the third row in the matrix of permanent magnet members are spaced apart from each other to form a second flow path parallel to the longitudinal axis,
   wherein the third row in the matrix of permanent magnet members and the fourth row in the matrix of permanent magnet members are spaced apart from each other to form a third flow path parallel to the longitudinal axis,
   wherein the permanent magnet members comprising the first and second rows in the matrix formation are positioned spaced apart and opposite each other in opposite, singularly alternating magnetic relations such that a magnetic attraction is established along the first flow path between the first row of permanent magnet members and the second row of permanent magnet members in the matrix formation,
   wherein the permanent magnet members comprising the second and third rows in the matrix formation are positioned spaced apart and opposite each other in opposite, singularly alternating magnetic relations such that a magnetic attraction is established along the second flow path between the second row of permanent magnet members and the third row of permanent magnet members in the matrix formation,
   wherein the permanent magnet members comprising the third and fourth rows in the matrix formation are positioned spaced apart and opposite each other in opposite, singularly alternating magnetic relations such that a magnetic attraction is established along the third flow path between the third row of permanent magnet members and the fourth row of permanent magnet members in the matrix formation, wherein the spacing between the permanent magnet members forming the first row, the spacing between the permanent magnet members forming the second row, the spacing between the permanent magnet members forming the third row, and the spacing between the permanent magnet members forming the fourth row each serve as a flow path not parallel to the longitudinal axis to provide fluid communication between the first, second, and third flow paths parallel to the longitudinal axis, and wherein the matrix formation of the plurality of permanent magnet members allows for the water to flow from the inlet to the outlet of the tank such that the water is subjected to magnetic fields created by the permanent magnet members.

12. The magnetic water conditioner of claim 11, wherein the water source is a pump.

13. The magnetic water conditioner of claim 11, wherein the water is subjected to the magnetic fields such that the water experiences at least three magnetic field transitions per foot as it flows from the inlet to the outlet of the tank.

14. The magnetic water conditioner of claim 11, wherein the tank is cylindrical having a circumference.

15. The magnetic water conditioner of claim 11, further comprising an assembly for retaining the plurality of permanent magnet members in the matrix formation within the tank.

16. The magnetic water conditioner of claim 11, wherein the magnetic water conditioner is placed in close proximity and downstream to the water source.

17. The magnetic water conditioner of claim 11 further comprising an outlet pipe coupled to the outlet to transport the water from the magnetic water conditioner.

18. The magnetic fluid conditioner of claim 11, wherein the lengths of one or more of said plurality of permanent magnet members are aligned perpendicular to the longitudinal axis.

19. A method for magnetically treating water for agricultural purposes, the method comprising passing the water through magnetic fields inside a magnetic water conditioner, the magnetic water conditioner comprising:

a tank having a longitudinal axis and an inlet disposed at a first end of the tank, the inlet operable to receive water from a water source, and an outlet disposed at a second end of the tank opposite the first end, the outlet operable to discharge the water; and a plurality of permanent magnet members arranged in the tank in a matrix formation to define three or more flow paths parallel to the longitudinal axis, wherein the three or more flow paths are in fluid communication with each other, wherein each of the permanent magnet members comprises a rectangular tube retaining one or more permanent magnets aligned such that each end of each permanent magnet member includes a north pole of one of said one or more permanent magnets and a south pole of one of said one or more permanent magnets;

wherein one or more of the plurality of permanent magnet members includes a height extending along a first axis and a length extending along a second axis, wherein the length is greater than the height, wherein the plurality of permanent magnet members are aligned in the matrix formation such that the lengths of said permanent magnet members are not parallel to said longitudinal axis and the flow of water between said inlet and outlet, wherein the one or more permanent magnets comprising one or more of the permanent magnet members are aligned such that at least two sides of the one or more permanent magnet members have both a north pole and a south pole along the length of the permanent magnet member, wherein a first plurality of the permanent magnet members are aligned and spaced apart one another in the interior of the tank to form a first row in the matrix of permanent magnet members, the first row having a spacing between each of the permanent magnet members forming the first row in the matrix, wherein opposing sides of adjacent permanent magnet members forming the first row in the matrix are arranged in a singularly alternating magnetic attraction orientation such that a magnetic attraction is established in the spacing between each of the permanent magnet members forming the first row in the matrix formation, wherein a second plurality of the permanent magnet members are aligned and spaced apart one another in the interior of the tank to form a second row in the matrix of permanent magnet members, the second row having a spacing between each of the permanent magnet members forming the second row in the matrix, wherein opposing sides of adjacent permanent magnet members forming the second row in the matrix are arranged in a singularly alternating magnetic attraction orientation such that a magnetic attraction is established in the spacing between each of the permanent magnet members forming the second row in the matrix formation, wherein a third plurality of the permanent magnet members are aligned and spaced apart one another in the interior of the tank to form a third row in the matrix of permanent magnet members, the third row having a spacing between each of the permanent magnet members forming the third row in the matrix, wherein opposing sides of adjacent permanent magnet members forming the third row in the matrix are arranged in a singularly alternating magnetic attraction orientation such that a magnetic attraction is established in the spacing between each of the permanent magnet members forming the third row in the matrix formation, wherein a fourth plurality of the permanent magnet members are aligned and spaced apart one another in the interior of the tank to form a fourth row in the matrix of permanent magnet members, the fourth row having a spacing between each of the permanent magnet members forming the fourth row in the matrix, wherein opposing sides of adjacent permanent magnet members forming the fourth row in the matrix are arranged in a singularly alternating magnetic attraction orientation such that a magnetic attraction is established in the spacing between each of the permanent magnet members forming the fourth row in the matrix formation, wherein the first row in the matrix of permanent magnet members and the second row in the matrix of permanent magnet members are spaced apart from each other to form a first flow path parallel to the longitudinal axis, wherein the second row in the matrix of permanent magnet members and the third row in the matrix of permanent magnet members are spaced apart from each other to form a second flow path parallel to the longitudinal axis, wherein the third row in the matrix of permanent magnet members and the fourth row in the matrix of permanent magnet members are spaced apart from each other to form a third flow path parallel to the longitudinal axis, wherein the permanent magnet members comprising the first and second rows in the matrix formation are positioned spaced apart and opposite each other in opposite, singularly alternating magnetic relations such that a magnetic attraction is established along the first flow path between the first row of permanent magnet members and the second row of permanent magnet members in the matrix formation, wherein the permanent magnet members comprising the second and third rows in the matrix formation are positioned spaced apart and opposite each other in opposite, singularly alternating magnetic relations such that a magnetic attraction is established along the second flow path between the second row of permanent magnet members and the third row of permanent magnet members in the matrix formation, wherein the permanent magnet members comprising the third and fourth rows in the matrix formation are positioned spaced apart and opposite each other in opposite, singularly alternating magnetic relations such that a magnetic attraction is established along the third flow path between the third row of permanent magnet members and the fourth row of permanent magnet members in the matrix formation, wherein the spacing between the permanent magnet members forming the first row, the spacing between the permanent magnet members forming the second row, the spacing between the permanent magnet members forming the third row, and the spacing between the permanent magnet members forming the fourth row each serve as a flow path not parallel to the longitudinal axis to provide fluid communication between the first, second, and third flow paths parallel to the longitudinal axis, and wherein the matrix formation of the plurality of permanent magnet members allows for the water to flow from the inlet to the outlet of the tank such that the water is subjected to magnetic fields created by the permanent magnet members.

20. The method of claim 19 further comprising adding fertilizer to the magnetically treated water.

21. The method of claim 19 further comprising irrigating plants or crops with the magnetically treated water.

22. The method of claim 19 further comprising drip irrigating plants or crops with the magnetically treated water.

23. The method of claim 19, wherein the lengths of one or more of said plurality of permanent magnet members are aligned perpendicular to the longitudinal axis.

24. The method of claim 19, wherein the magnetic water conditioner further comprises an assembly for retaining said permanent magnet members in the matrix formation within said tank.

25. The method of claim 19, wherein the water is subjected to the magnetic fields such that the water experiences at least three magnetic field transitions per foot as it flows from the inlet to the outlet of the tank.

26. A method for magnetically treating fluid for agricultural purposes, the method comprising passing the fluid through magnetic fields inside a magnetic fluid conditioner, the magnetic fluid conditioner comprising:

a tank having a longitudinal axis and an inlet disposed at a first end of the tank, the inlet operable to receive fluid from the fluid source, and an outlet disposed at a second end of the tank opposite the first end, the outlet operable to discharge the fluid; and a plurality of permanent magnet members arranged in the tank in a matrix formation to define three or more flow paths parallel to the longitudinal axis, wherein the three or more flow paths are in fluid communication with each other, wherein each of the permanent magnet members comprises rectangular tube retaining a plurality of permanent magnets aligned such that each end of each permanent magnet member includes a north pole of one of said plurality of permanent magnets and a south pole of one of said plurality of permanent magnets;

wherein one or more of the plurality of permanent magnet members includes a height extending along a first axis and a length extending along a second axis, wherein the length is greater than the height, wherein the plurality of permanent magnet members are disposed in the interior of the tank in the matrix formation, one or more of the plurality of permanent magnet members having lengths not being parallel to the longitudinal axis of the tank, wherein two or more of the permanent magnet members are spaced apart in the matrix formation with both north poles and south poles disposed at opposite sides of each of the two or more spaced apart permanent magnet members, wherein the plurality of permanent magnets comprising one or more of the permanent magnet members are aligned such that a side of the one or more permanent magnet members has alternating polarities of the permanent magnets along its respective length of the permanent magnet member, wherein adjacent permanent magnet members in the matrix formation have opposite, alternating polarities of the permanent magnets along lengths of adjacent sides of the adjacent permanent magnet members, wherein a first plurality of the permanent magnet members are aligned and spaced apart one another in a singularly alternating magnetic attraction orientation in the interior of the tank to form a first row in the matrix of permanent magnet members, the first row having a spacing between each of the permanent magnet members forming the first row in the matrix, wherein a magnetic attraction is established in the spacing between each of the permanent magnet members forming the first row in the matrix, and wherein both north poles and south poles are disposed at opposite sides of each of the spaced apart permanent magnet members comprising the first row of permanent magnet members in the matrix formation, wherein a second plurality of the permanent magnet members are aligned and spaced apart one another in a singularly alternating magnetic attraction orientation in the interior of the tank to form a second row in the matrix of permanent magnet members,. the second row having a spacing between each of the permanent magnet members forming the second row in the matrix, wherein a magnetic attraction is established in the spacing between each of the permanent magnet members forming the second row in the matrix, and wherein both north poles and south poles are disposed at opposite sides of each of the spaced apart permanent magnet members comprising the second row of permanent magnet members in the matrix formation, wherein a third plurality of the permanent magnet members are aligned and spaced apart one another in a singularly alternating magnetic attraction orientation in the interior of the tank to form a third row in the matrix of permanent magnet members, the third row having a spacing between each of the permanent magnet members forming the third row in the matrix, wherein a magnetic attraction is established in the spacing between each of the permanent magnet members forming the third row in the matrix, and wherein both north poles and south poles are disposed at opposite sides of each of the spaced apart permanent magnet members comprising the third row of permanent magnet members in the matrix formation, wherein a fourth plurality of the permanent magnet members are aligned and spaced apart one another in a singularly alternating magnetic attraction orientation in the interior of the tank to form a fourth row in the matrix of permanent magnet members, the fourth row having a spacing between each of the permanent magnet members forming the fourth row in the matrix, wherein a magnetic attraction is established in the spacing between each of the permanent magnet members forming the fourth row in the matrix, and wherein both north poles and south poles are disposed at opposite sides of each of the spaced apart permanent magnet members comprising the fourth row of permanent magnet members in the matrix formation, wherein the first row in the matrix of permanent magnet members and the second row in the matrix of permanent magnet members are spaced apart from each other to form a first flow path parallel to the longitudinal axis, wherein the second row in the matrix of permanent magnet members and the third row in the matrix of permanent magnet members are spaced apart from each other to form a second flow path parallel to the longitudinal axis, wherein the third row in the matrix of permanent magnet members and the fourth row in the matrix of permanent magnet members are spaced apart from each other to form a third flow path parallel to the longitudinal axis, wherein the permanent magnet members comprising the first and second rows in the matrix formation are positioned spaced apart and opposite each other in an opposite, singularly alternating magnetic relation such that a magnetic attraction is established along the first flow path between the first row of permanent magnet members and the second row of permanent magnet members in the matrix formation, wherein the permanent magnet members comprising the second and third rows in the matrix formation are positioned spaced apart and opposite each other in an opposite, singularly alternating magnetic relation such that a magnetic attraction is established along the second flow path between the second row of permanent magnet members and the third row of permanent magnet members in the matrix formation, wherein the permanent magnet members comprising the third and fourth rows in the matrix formation are positioned spaced apart and opposite each other in an opposite, singularly alternating magnetic relation such that a magnetic attraction is established along the third flow path between the third row of permanent magnet members and the fourth row of permanent magnet members in the matrix formation, wherein the spacing between the permanent magnet members forming the first row, the spacing between the permanent magnet members forming the second row, the spacing between the permanent magnet members forming the third row, and the spacing between the permanent magnet members forming the fourth row each serve as a flow path not parallel to the longitudinal axis to provide fluid communication between the first, second, and third flow paths parallel to the longitudinal axis, and wherein the matrix formation of the plurality of permanent magnet members allows for the fluid to flow from the inlet to the outlet of the tank such that the fluid is subjected to magnetic fields created by the permanent magnet members.

27. The method of claim 26 further comprising adding fertilizer to the magnetically treated fluid.

28. The method of claim 26 further comprising irrigating plants or crops with the magnetically treated fluid.

29. The method of claim 26 further comprising drip irrigating plants or crops with the magnetically treated fluid.

30. The method of claim 26, wherein the lengths of one or more of the plurality of permanent magnet members are aligned perpendicular to the longitudinal axis.

31. The method of claim 26, wherein the magnetic fluid conditioner further comprises an assembly for retaining said permanent magnet members in the matrix formation within said tank.

32. The method of claim 26, wherein the fluid is subjected to the magnetic fields such that the fluid experiences at least three magnetic field transitions per foot as it flows from the inlet to the outlet of the tank.

33. A magnetic fluid conditioner for applying a magnetic flux density to a fluid flowing through a pipe to reduce the formation of precipitates in the fluid, the magnetic fluid conditioner comprising:

a cylindrical member having a first end, a second end, an internal surface area, an external surface area, and a hollow internal volume of the cylindrical member extending along a longitudinal axis of the cylindrical member and defined by the boundaries of the first end, the second end and the internal surface area of the cylindrical member; and a plurality of magnets arranged in the cylindrical member in a matrix formation to define three or more flow paths parallel to the longitudinal axis, wherein the three or more flow paths are in fluid communication with each other, wherein one or more of the plurality of magnets includes a height extending along a first axis and a length extending along a second axis, wherein the length is greater than the height, wherein the plurality of magnets are disposed in the cylindrical member in the matrix formation, one or more of the plurality of magnets having lengths not being parallel to the longitudinal axis of the cylindrical member, wherein a first plurality of the magnets are arranged spaced apart adjacent one another in a singularly alternating magnetic attraction orientation to form a first row in the matrix of magnets, the first row having a spacing between each of the magnets forming the first row of magnets in the matrix formation, wherein a second plurality of the magnets are arranged spaced apart adjacent one another in a singularly alternating magnetic attraction orientation to form a second row in the matrix of magnets, the second row having a spacing between each of the magnets forming the second row of magnets in the matrix formation, wherein a third plurality of the magnets are arranged spaced apart adjacent one another in a singularly alternating magnetic attraction orientation to form a third row in the matrix of magnets, the third row having a spacing between each of the magnets forming the third row of magnets in the matrix formation, wherein a fourth plurality of the magnets are arranged spaced apart adjacent one another in a singularly alternating magnetic attraction orientation to form a fourth row in the matrix of magnets, the fourth row having a spacing between each of the magnets forming the fourth row of magnets in the matrix formation, wherein the first row in the matrix of magnets and the second row in the matrix of magnets are spaced apart from each other to form a first flow path parallel to the longitudinal axis, wherein the second row in the matrix of magnets and the third row in the matrix of magnets are spaced apart from each other to form a second flow path parallel to the longitudinal axis, wherein the third row in the matrix of magnets and the fourth row in the matrix of magnets are spaced apart from each other to form a third flow path parallel to the longitudinal axis, wherein the magnets comprising the first and second rows in the matrix formation are positioned spaced apart and opposite each other in a complementary singularly alternating relation such that a magnetic attraction is established along the first flow path between the first row of magnets and the second row of magnets in the matrix formation, wherein the magnets comprising the second and third rows in the matrix formation are positioned spaced apart and opposite each other in a complementary singularly alternating relation such that a magnetic attraction is established along the second flow path between the second row of magnets and the third row of magnets in the matrix formation, wherein the magnets comprising the third and fourth rows in the matrix formation are positioned spaced apart and onsite each other in a complementary singularly alternating relation such that a magnetic attraction is established along the third flow path between the third row of magnets and the fourth row of magnets in the matrix formation, wherein the spacing between the magnets forming the first row of magnets, the spacing between the magnets forming the second row of magnets the spacing between the magnets forming the third row, and the spacing between the magnets forming the fourth row each serve as a flow path not parallel to the longitudinal axis to provide fluid communication between the first, second, and third flow paths parallel to the longitudinal axis, and wherein the matrix formation of the plurality of magnets allows for fluid to flow from the first end of the cylindrical member to the second end of the cylindrical member, such that a fluid flowing from the first end of the cylindrical member to the second end of the cylindrical member will be subjected to a magnetic flux density.

* * * * *